US007315516B2

(12) United States Patent
Byun

(10) Patent No.: US 7,315,516 B2
(45) Date of Patent: Jan. 1, 2008

(54) METHOD FOR GENERATING CASTING PATH AMONG PARTICIPANTS FOR MULTICASTING

(75) Inventor: Ghi-Birm Byun, Seoguipo-shi (KR)

(73) Assignee: Ghizi Soft Co., Ltd. (KR)

( * ) Notice: Subject to any disclaimer, the term of this patent is extended or adjusted under 35 U.S.C. 154(b) by 726 days.

(21) Appl. No.: 10/488,375

(22) PCT Filed: Sep. 6, 2002

(86) PCT No.: PCT/KR02/01688

§ 371 (c)(1),
(2), (4) Date: Mar. 1, 2004

(87) PCT Pub. No.: WO03/021882

PCT Pub. Date: May 13, 2003

(65) Prior Publication Data

US 2004/0213168 A1  Oct. 28, 2004

(30) Foreign Application Priority Data

Sep. 6, 2001  (KR) ............... 2001-54703

(51) Int. Cl.
*H04L 12/28* (2006.01)
(52) U.S. Cl. ....................... 370/255; 370/400
(58) Field of Classification Search .......... None
See application file for complete search history.

(56) References Cited

U.S. PATENT DOCUMENTS 5,355,371 A * 10/1994 Auerbach et al. ........... 370/408

(Continued)

FOREIGN PATENT DOCUMENTS

EP      0 598 671 A2    5/1994

(Continued)

OTHER PUBLICATIONS

"The New Shortest Best Path Tree (SBPT) Algorithm for Dynamic Multicast Trees"; Authors: Hiroshi Fujinoki and Kenneth J. Christensen; 8 Pgs., Oct. 1999.

(Continued)

*Primary Examiner*—Edan Orgad
*Assistant Examiner*—Lawrence J Burrowes
(74) *Attorney, Agent, or Firm*—Cantor Colburn LLP

(57) ABSTRACT

A method of generating relay paths among a plurality of participants in multi-transmission is provided for transmitting predetermined data to the participants. The method includes a first step of analyzing access paths of the participants; a second step of generating a binary tree structure of relay paths among participants belonging to each subnet group; a third step of arranging gateways on the access paths of the participants according to the order on a connection path connecting the gateways to a data server; a fourth step of classing gateways, which are connected to the same upper gateway and are at the same level as a result of the arrangement, as a subordinate set of the upper gateway; and a fifth step of calculating the number of hops of each gateway within the subordinate set to a corresponding subnet group and generating a binary tree structure of relay paths starting from a gateway having relatively fewer hops toward a gateway having relatively more hops.

12 Claims, 18 Drawing Sheets

U.S. PATENT DOCUMENTS

| | | | | | |
|---|---|---|---|---|---|
| 5,666,360 | A | * | 9/1997 | Chen et al. | 370/392 |
| 5,926,463 | A | * | 7/1999 | Ahearn et al. | 370/254 |
| 5,946,316 | A | * | 8/1999 | Chen et al. | 370/408 |
| 6,032,194 | A | | 2/2000 | Gai et al. | 709/239 |
| 6,061,712 | A | * | 5/2000 | Tzeng | 709/202 |
| 6,078,590 | A | | 6/2000 | Farinacci et al. | 370/432 |
| 6,088,333 | A | | 7/2000 | Yang et al. | 370/238 |
| 6,163,807 | A | * | 12/2000 | Hodgkinson et al. | 709/229 |
| 6,192,051 | B1 | * | 2/2001 | Lipman et al. | 370/389 |
| 6,388,995 | B1 | * | 5/2002 | Gai et al. | 370/256 |
| 6,618,755 | B1 | * | 9/2003 | Bonn | 709/223 |
| 6,697,365 | B1 | * | 2/2004 | Messenger | 370/390 |
| 6,707,796 | B1 | * | 3/2004 | Li | 370/254 |
| 6,914,894 | B2 | * | 7/2005 | Wilmer et al. | 370/338 |
| 7,042,878 | B2 | * | 5/2006 | Li | 370/392 |
| 7,103,054 | B2 | * | 9/2006 | Novaes | 370/401 |
| 7,185,077 | B1 | * | 2/2007 | O'Toole et al. | 709/223 |

FOREIGN PATENT DOCUMENTS

EP    1 107 507 A2    6/2001

OTHER PUBLICATIONS

"An Efficient Multicast Routing Algorithm for Delay-Sensitive Applications with Dynamic Membership."; Authors: Sung-Pil Hong, Heesang Lee and Bum Hwan Park; IEEE; 1998; pp. 1433-1440.

"Distributed Algorithms for Multicast Path Setup in Data Networks"; Authors: Fred Bauer and Anujan Varma; IEEE; 1995;pp. 1374-1378.

"Distributed Algorithms for Multicast Path Setup in Data Networks"; Authors: Fred Bauer and Anujan Varma; Transactions on Networking, vol. 4, No. 2; IEEE; Apr. 1996; pp. 181-191.

"Multicast Routing in Internetworks Using Dynamic Core Based Trees"; Authors: A.D. Reghavendra and S. Rai; IEEE; 1996; pp. 232-238.

"Multicast Tree Construction in Directed Networks"; Author: J. Eric Klinker; IEEE; 1996; pp. 496-500.

"A Dynamic Programmable Shared Virtual Path Assignment Algorithm for Multipoint Communication in ATM Networks"; Authors: S. Selvakumar, J. Karthik, G.V. Ravi Shankar and Y. Ramakrishna; IEEE; 1999; pp. 254-258.

"Distributed Quality of Service Multicast Routing with Multiple Metrics for Receiver Initiated Joins"; Authors: Miguel Rio and Peter F. Linington; IEEE; 2000; pp. 180-187.

* cited by examiner (a)

| G - A | G - B | G - C | Sub - a | 100 |

FIG.6B

| G - A | ... |
|---|---|
| 100 | 100 |

(a)

| G - B | ... |
|---|---|
| 100 | 100 |

(b)

| G - C | ... |
|---|---|
| 100 | 100 |

(c)

| VGa | ... |
|---|---|
| 100 | 100 |

(d)

| 100 | ... |

| | | | | | |
|---|---|---|---|---|---|
| G - A | G - B | G - C | | Sub - a | 100 |
| G - A | G - B | G - C | | Sub - a | 110 |
| G - A | G - B | G - C | G - D | Sub - b | 200 |
| G - A | G - E | | | Sub - c | 300 |
| G - F | | | | Sub - d | 400 |
| G - A | G - G | | | Sub - e | 500 |
| G - A | G - H | | | Sub - f | 600 |

FIG.7B (a)

| G - F | | G - A | | ... |
|---|---|---|---|---|
| 400 | 400 | 300 | 500 | |

(b)

| G - E | | G - G | | G - H | | G - B | | ... |
|---|---|---|---|---|---|---|---|---|
| 300 | 300 | 500 | 500 | 600 | 600 | 100 | 200 | |

(c)

| G - C | | ... |
|---|---|---|
| 100 | 200 | |

(d)

| VGa | | G - D | | ... |
|---|---|---|---|---|
| 100 | 110 | 200 | 200 | |

(e)

| VGb | | ... |
|---|---|---|
| 200 | 200 | |

(f)

| VGc | | ... |
|---|---|---|
| 300 | 300 | |

(g)

| VGd | | ... |
|---|---|---|
| 400 | 400 | |

(h)

| VGe | | ... |
|---|---|---|
| 500 | 500 | |

(i)

| VGf | | ... |
|---|---|---|
| 600 | 600 | |

(j) Sub - a | 100 | 110 | ...

(k) Sub - b | 200 | ...

(l) Sub - c | 300 | ...

(m) Sub - d | 400 | ...

(n) Sub e | 500 | ...

(o) Sub - f | 600 | ...

(d)
| VGa | G - D | ... |
|---|---|---|
| 100 \| 110 | 200 \| 200 | |

(e)
| VGb | ... |
|---|---|
| 200 \| 200 | |

(f)
| VGc | ... |
|---|---|
| 300 \| 300 | |

(g)
| VGd | ... |
|---|---|
| 400 \| 400 | |

(h)
| VGf | ... |
|---|---|
| 600 \| 600 | |

(i) Sub - a | 100 | 110 | ...

(j) Sub - b | 200 | ...

(k) Sub - c | 300 | ...

(l) Sub - d | 400 | ...

(m) Sub - f | 600 | ...

METHOD FOR GENERATING CASTING PATH AMONG PARTICIPANTS FOR MULTICASTING

TECHNICAL FIELD

The present invention relates to a method for realizing multicasting using a multi-transmission method of relaying predetermined data among users accessing a data server, and more particularly, to a method in which a data server generates a binary tree structure of relay paths among participants in multi-transmission.

Internet, as a global network, should be able to meet the simultaneous access requests of an unspecified number of netizens throughout the world. In other words, in an Internet environment, a data server should be able to simultaneously transmit data to a great number of users accessing the data server.

In view of transmitters/receivers participating in data transmission, data transmission modes used in the Internet can be divided into a unicast transmission mode, a broadcast transmission mode, and a multicast transmission mode. It has been recognized that the multicast transmission mode is optimal for multi-transmission, and thus various researches on the multicast transmission mode have been performed.

BACKGROUND ART

At present, the unicast transmission mode is usually used over Internet. The unicast transmission mode allows a single transmitter to transmit data to a single receiver.

Unlike the unicast transmission mode, the multicast transmission mode allows a single transmitter to transmit data to multiple receivers. The multicast transmission mode has been researched and developed in various research institutions. An Internet protocol (IP) multicast transmission mode is the multicast transmission mode that has been developed for common use and is being used at present. The IP multicast transmission mode is network-level multicast in which a transmitter marks the address of a group, to which a receiver belongs, in the header of a data transmission packet instead of marking the address of the receiver and transmits multicast data to the router of a local group. Accordingly, the IP multicast transmission mode is advantageous in minimizing the waste of network resources caused by repetition of data transmission.

Since not an actual host address but a group address according to a D-class IP address is marked on the header of a transmission packet in the IP multicast transmission mode, a special router for supporting the transmission of multicast data packets is required. In the meantime, most of present Internet routers do not support the transmission of multicast data packets. Accordingly, to realize IP multicast, all routers on a data transmission path must be replaced with routers supporting the multicast data packet transmission. Accordingly, it is impossible to actually apply the IP multicast transmission mode to the Internet.

To overcome this problem, another IP multicast transmission mode, in which packets encapsulated based on the concept of tunneling are transmitted, is used.

In the IP multicast transmission mode using tunneling, a tunnel among multicast routers is set. Thereafter, when a multicast router supporting multicast routes a data packet, the multicast router adds the IP addresses of both ends of the tunnel to the front of the header of the data packet. In other words, when the multicast data packet passes through usual routers which do not support multicast, the multicast data packet is routed in the same manner as unicast packets, based on the IP addresses of both ends of the tunnel. Accordingly, the multicast transmission mode using tunneling can be implemented in the present Internet environment. However, the IP multicast transmission mode using tunneling can be applied to only a very small number of receivers having a router supporting multicast. Moreover, since information on final receivers cannot be obtained, it is impossible to bill them for commercialized multicast services.

Multicast transmission modes researched at present can be largely divided into network-level multicast and application-level multicast.

In the network-level multicast transmission mode, a router is provided with an additional function of performing distributed transmission in hardware. In order to apply the network-level multicast transmission mode to the Internet, all of the routers on the Internet must be replaced with routers having the additional function. Consequently, it is impossible to actually apply the network-level multicast transmission mode to the internet.

In the application-level multicast transmission mode, a primary receiver receiving data from a transmitter transmits the data to a secondary receiver. In the case where an unspecified number of users simultaneously request access and thus the number of connection paths rapidly increases, it is difficult for a transmitter to manage the connection paths. Accordingly, the number of users that are allowed for simultaneous access is limited. In addition, in the case of disconnection of an upper receiver, maintenance of connection of a large number of lower receivers and the reliability of data transmission cannot be secured.

DISCLOSURE OF THE INVENTION

To solve the above problems, it is an object of the present invention to provide a method for generating a binary tree structure of relay paths among all participants in multi-transmission to allow the participants to relay data to two neighboring participants, thereby minimizing changes in the relay paths among existing participants when a new participant is added or an existing participant withdraws and providing stable and reliable data transmission for participant.

To achieve the object of the invention, there is provided a method for generating relay paths among a plurality of participants in multi-transmission to provide predetermined data to the participants. The method includes a first step of analyzing access paths of the participants; a second step of generating a binary tree structure of relay paths among participants belonging to each subnet group; a third step of arranging gateways on the access paths of the participants according to the order on a connection path connecting the gateways to a data server; a fourth step of classing gateways, which are connected to the same upper gateway and are at the same level as a result of the arrangement, as a subordinate set of the upper gateway; and a fifth step of calculating the number of hops of each gateway within the subordinate set to a corresponding subnet group and generating a binary tree structure of relay paths starting from a gateway having relatively fewer hops toward a gateway having relatively more hops.

BEST MODE FOR CARRYING OUT THE INVENTION

Hereinafter, a preferred embodiment of a method for generating relay paths for multi-transmission according to the present invention will be described in detail with reference to the attached drawings.

Figure 1:
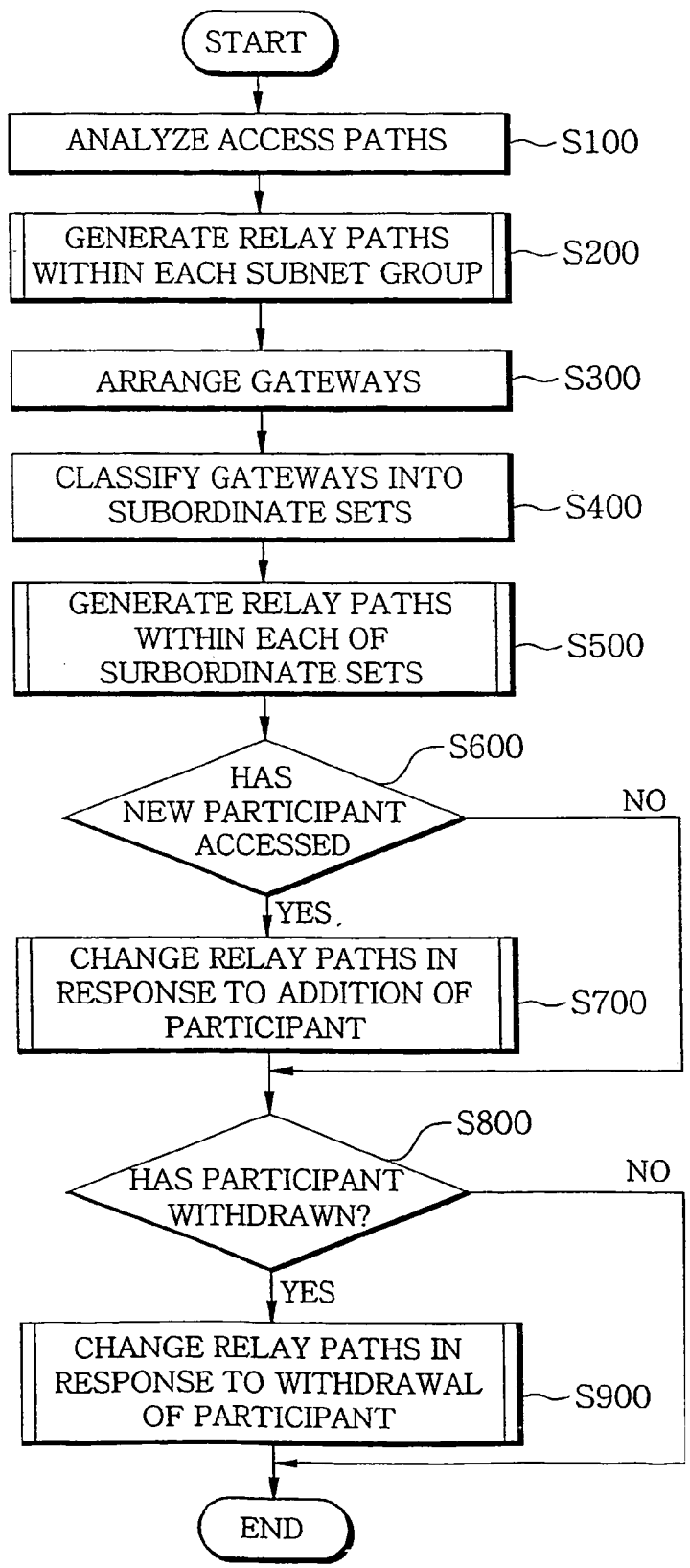
FIG. 1 is a flowchart of a method for generating relay paths among participants in multi-transmission according to an embodiment of the present invention.

FIG. 1 is a flowchart of a method for generating relay paths among participants in multi-transmission according to an embodiment of the present invention. Referring to FIG. 1, in order to transmit data to a plurality of participants accessing a data server to receive the data using a multi-transmission mode, the data server analyzes the access paths of the participants in step S100. In other words, the data server analyzes the identifier of each participant, a subnet group to which the participant belongs, and information about gateways through the participant passes for accessing the data server.

In addition, the data server generates a binary tree structure of relay paths among participants belonging to each subnet group using the result of analysis in step S200.

The data server arranges the gateways on the access paths of the participants according to the order of connection to the data server in step S300 and groups gateways, which are arranged on the same level and connected to the same upper gateway, into a subordinate set of the upper gateway in step S400.

According to the classification, the data server generates a binary tree structure of relay paths among the gateways within each subordinate set in step 500. Here, the data server calculates the number of hops of each gateway in the subordinate set to a corresponding subnet group and generates a binary tree structure of relay paths from a gateway having a relatively fewer hops to gateways having relatively more hops. The data server calculates the number of hops in order to generate relay paths among neighboring gateways.

After generating the relay paths as described above, if it is determined that a new participants has accessed in step S600, or if it is determined that an existing participant has withdrawn in step S800, the data server identifies the access path of the new participant or the withdrawing participant (hereinafter, referred to as a seceder) and changes only a relay path including the new participant or the seceder in step S700 or S900.

Figure 1A:
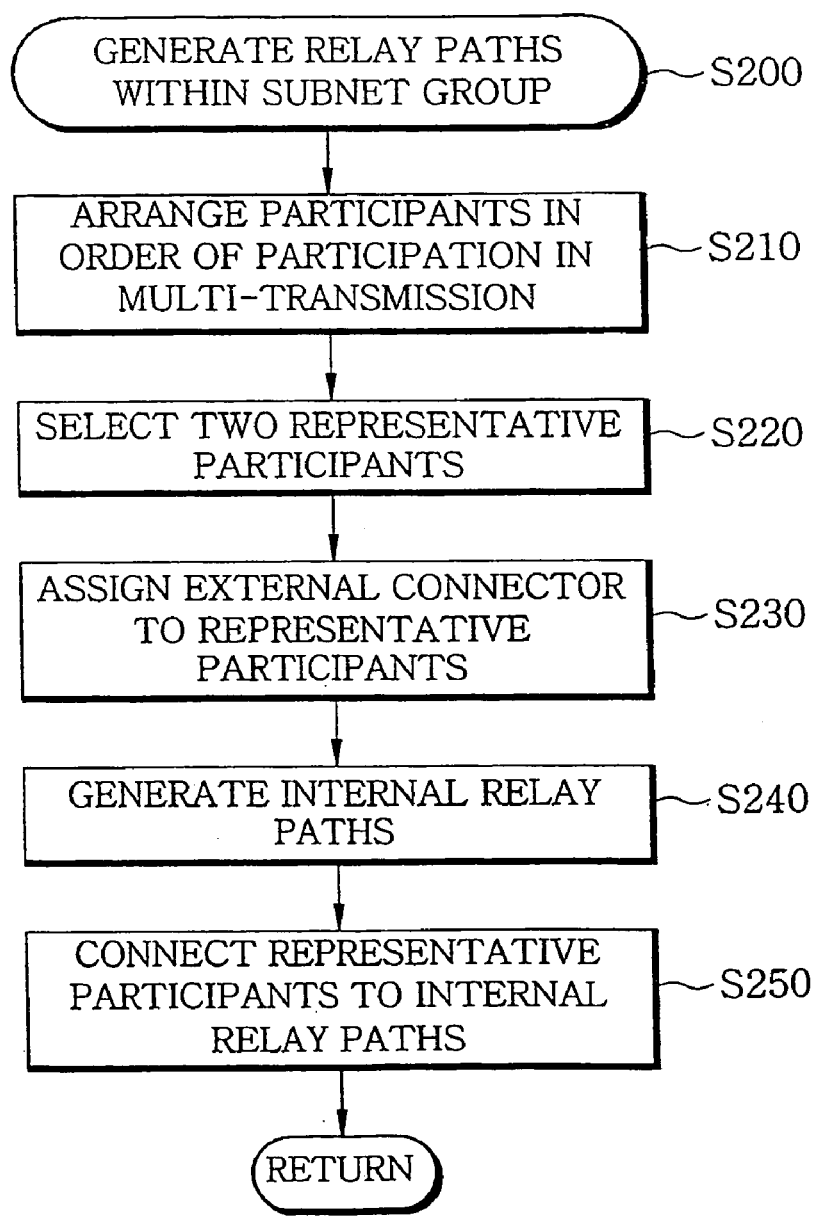
FIG. 1A is a flowchart of a procedure for generating relay paths in each subnet group according to the embodiment of the present invention.

FIG. 1A is a flowchart of a procedure for generating relay paths in each subnet group according to the embodiment of the present invention. Referring to FIG. 1A, in order to generate relay paths in each subnet group, the data server arranges participants within each subnet group in order of participation in multi-transmission and generates a participant information list according to the arrangement in step S210. The data server selects two representative participants based on a participant information list generated with respect to each subnet group in step S220. In other words, the data server extracts two participants that has participated first in multi-transmission based on a participant information list generated with respect to each subnet group and selects them as representative participants of the corresponding subnet group.

The data server assigns two virtual connectors for generating relay paths to each of the representative participants of each subnet group in step 230. The virtual connectors include an internal connector and an external connector. The internal connector is for generating a relay path between a representative participant and another participant in the corresponding subnet group. The external connector is for generating a relay path between a representative participant in the corresponding subnet group and a participant in another subnet group.

In other words, the data server sequentially transmits external connectors to gateways requiring a virtual connector among the upper gateways of a corresponding subnet group so that a binary tree structure of relay paths can be generated. Here, the data server transmits the virtual connector from a lower gateway nearer the subnet group to an upper gateway nearer the data server among the gateways requiring the virtual connector.

Meanwhile, the data server generates a binary tree structure of relay paths among the remaining participants other than the representative participants in each subnet group in step S240.

Here, in order to generate relay paths among participants belonging to each subnet group, the data server generates relay paths from an n-th participant other than representative participants on a participant information list to a 2n-th participant and to a (2n+1)-th participant. Through such generated relay paths, among the participants other than the representative participants, a first (n=1) participant (actually a third participant) relays data to a second participant (2n=2) and a third participant (2n+1=3) (actually fourth and fifth participants).

If a binary tree structure of relay paths among the participants other than the representative participants in each subnet group is generated, the data server generates a relay path between a representative participant of each subnet group and the binary tree structure of relay paths within the corresponding subnet group in step S250. In other words, the manager of each subnet group divides the representative participants of the corresponding subnet group into a first representative participant and a second representative participant according to the order of participation, generates a relay path between the first and second representative participants based on the internal connector of the first representative participant, and generates a relay path between the second representative participant and a participant at a top node in the binary tree structure of relay paths in the subnet group based on the internal connector of the second representative participant.

Figure 2:
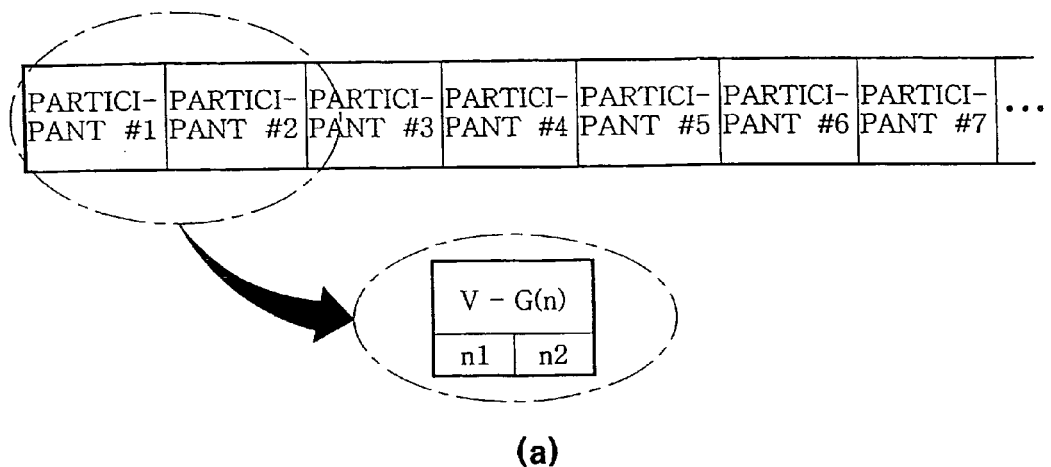
FIG. 2 illustrates the procedure for generating relay paths in a subnet group according to the embodiment of the present invention.
Figure 2:
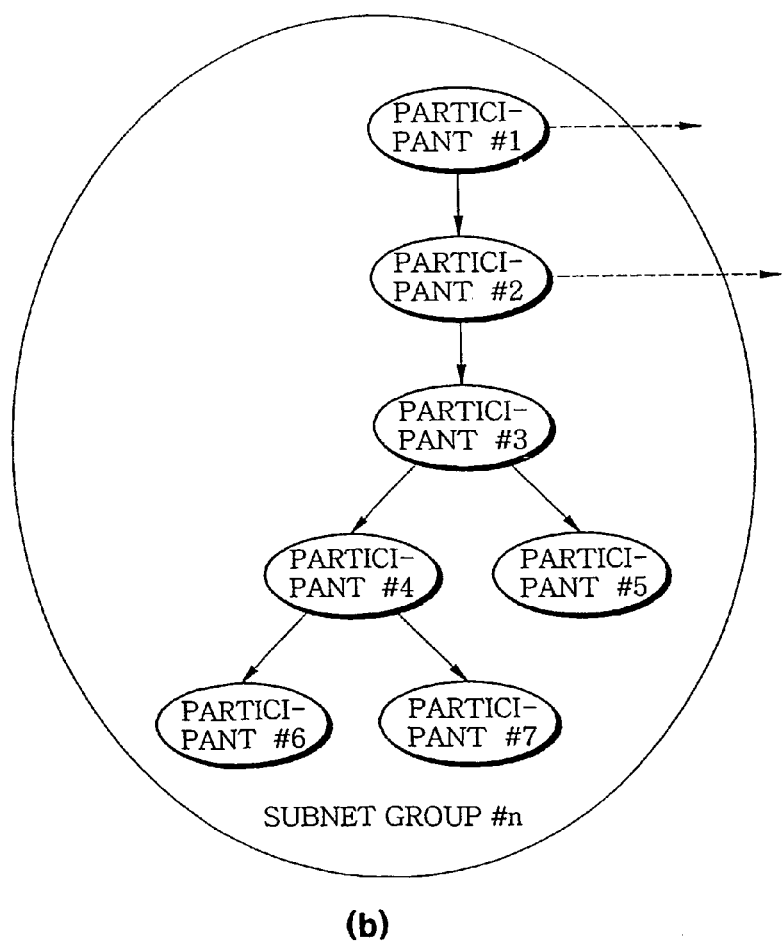

A procedure in which relay paths in each subnet group are generated through the above steps is illustrated in FIG. 2. The procedure will be described in more detail with reference to FIG. 2.

A participant information list in which participants in a certain subnet group (a subnet group #n) are arranged in order of participation, and representative participants selected from the participant information list are illustrated in (a) of FIG. 2. The representative participants selected from the participant information list are a participant #1 and a participant #2. The participant #1 is a first representative participant and the participant #2 is a second representative participant.

Meanwhile, in order to generate relay paths among gateways through which the participants pass, each of the gateways may have a maximum of two virtual connectors which are originated from the external connectors of the representative participants of a related subnet group. In other words, in order to generate a relay path between each subnet group and a gateway related to the corresponding subnet group at an upper level, the data server generates a virtual gateway having the external connectors of the representative participants of the subnet group as virtual connectors. V-G(n) shown in (a) of FIG. 2 denotes a virtual gateway of the subnet group #n. The virtual connectors of the virtual gateway V-G(n) are composed of an external connector n1 assigned to a first representative participant of the subnet group #n and an external connector n2 assigned to a second representative participant of the subnet group #n. If an upper gateway of the virtual gateway requests the virtual connectors for generation of relay paths, the data server transmits the virtual connectors of the virtual gateway to the upper gateway.

A result of generating relay paths among participants belonging to the subnet group #n is illustrated in (b) of FIG. 2. An arrow headed solid line denotes the internal connector of a participant, and an arrow headed dotted line denotes an external connector of a participant. Referring to (b) of FIG. 2, the data server generates a binary tree structure of relay paths among participants (a participant #3, a participant #4, a participant #5, a participant #6, a participant #7, . . . ) other than the representative participants #1 and #2 in the subnet group #n. Thereafter, the manager of the subnet group #n generates a relay path between the participant #3 at the top node in the binary tree type relay path and the second representative participant #2 according to the internal connector of the second representative a participant #2 and generates a relay path between the first representative a participant #1 and the second representative a participant #2 according to the internal connector of the first representative a participant #1.

Figure 1B:
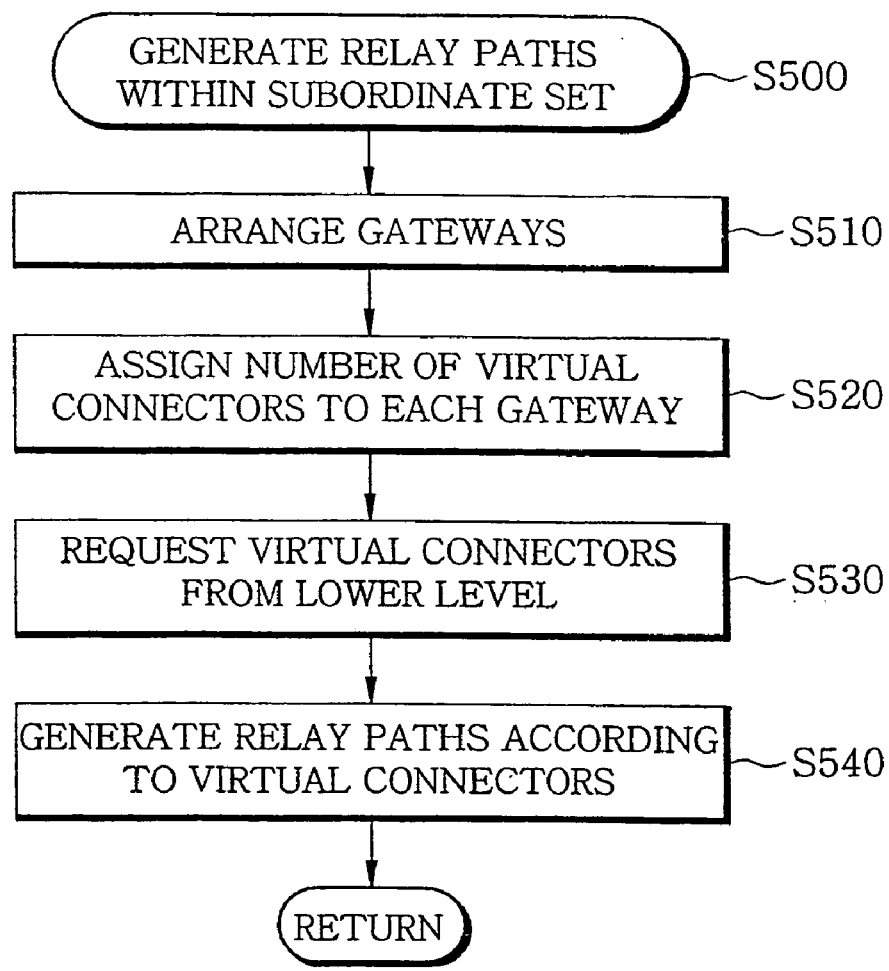
FIG. 1B is a flowchart of a procedure for generating relay paths within each subordinate set according to the embodiment of the present invention.

FIG. 1B is a flowchart of a procedure for generating relay paths within each subordinate set according to the embodiment of the present invention.

Referring to FIG. 1B, the data server arranges a plurality of gateways within each arbitrary subordinate set in ascending order of the number of hops of each gateway in step S510. The number of hops indicates the number of gateways existing between a corresponding gateway and a subnet group. For example, if a gateway G in a subordinate set A is an upper gateway of another subordinate set B including a plurality of gateways gs, the data server calculates the number of hops of the gateway G by averaging two least numbers of hops among the numbers of hops of the respective gateways gs in the subordinate set B.

After arranging gateways in each subordinate set according to the numbers of hops of the gateways, the data server determines the number of virtual connectors needed by each of the gateways in order to generate relay paths among the gateways in each subordinate set and assigns a necessary number of virtual connectors to each gateway in step S520. Here, the data server determines the number of virtual connectors needed by each of the gateways according to the number of the gateways included in the subordinate set.

Meanwhile, since gateways in each subordinate set are connected in a binary tree structure of relay paths, each gateway can use a maximum of two virtual connectors. For example, if a subordinate set includes four gateways after gateway arrangement, a first gateway relays data to second and third gateways, and the second gateway relays the data to a fourth gateway. Accordingly, the data server assigns two virtual connectors to the first gateway and one virtual connector to the second gateway, and it does not assign any virtual connector to the third and fourth gateways.

In the case where an arbitrary subordinate set is requested to transmit virtual connectors to its upper gateway, gateways within the subordinate set process the request of the upper gateway first. In other words, among the gateways within the subordinate set, two gateways having the least numbers of hops use virtual connectors, which the data server assigns to the two gateways, first in order to respond the request of the upper gateway. For example, if a certain subordinate set includes four gateways after gateway arrangement, and if the subordinate set is requested to transmit one virtual connector to an upper gateway, a first gateway of the subordinate set needs two virtual connectors. In other words, after allocating two virtual connectors to the is first gateway, the data server transmits one of the two virtual connectors to the upper gateway and generates a relay path for data relay from the first gateway to a second gateway using the other virtual connector. Since the second gateway needs two virtual connectors, the data server assigns two virtual connectors to the second gateway. Thereafter, the data server generates a relay path for data relay from the second gateway to a third gateway using one of the two virtual connectors and generates a relay path for data relay from the second gateway to a fourth gateway using the other virtual connector.

Here, the data server requests a necessary number of virtual connectors from a lower gateway or subordinate set and transmits the necessary number of virtual connectors to an upper gateway connected to the lower gateway or subordinate set. In other words, the data server requests a necessary number of virtual connectors for each gateway from its lower gateway or subordinate set in step S530. If a virtual connector is transmitted from the lower gateway or subordinate to its upper gateway in response to the request, the data server generates a binary structure of relay paths among gateways within a subordinate set including the gateway, which has received the virtual connector, according to the virtual connectors in step S540.

In other words, the data server generates relay paths from an n-th gateway to a 2n-th gateway and to a (2n+1)-th gateway among gateways in a certain subordinate set except a gateway assigned a virtual connector for responding to the request of an upper gateway of the subordinate set. For example, if a subordinate set including first through fourth gateways after gateway arrangement is requested to transmit one virtual connector from its upper gateway, the data server requests two virtual connectors from a lower gateway or subordinate set connected the first gateway, transmits one of the two virtual connectors to the upper gateway, and generates a relay path between the first and second gateways using the other virtual connector. Accordingly, the data server performs the above operations on the assumption that the second gateway is an n-th (n=1) gateway. In other words, the data server generates relay paths from the n-th gateway in the second place to 2n-th and (2n+1)-th gateways in the third and fourth places, respectively.

Figure 1C:
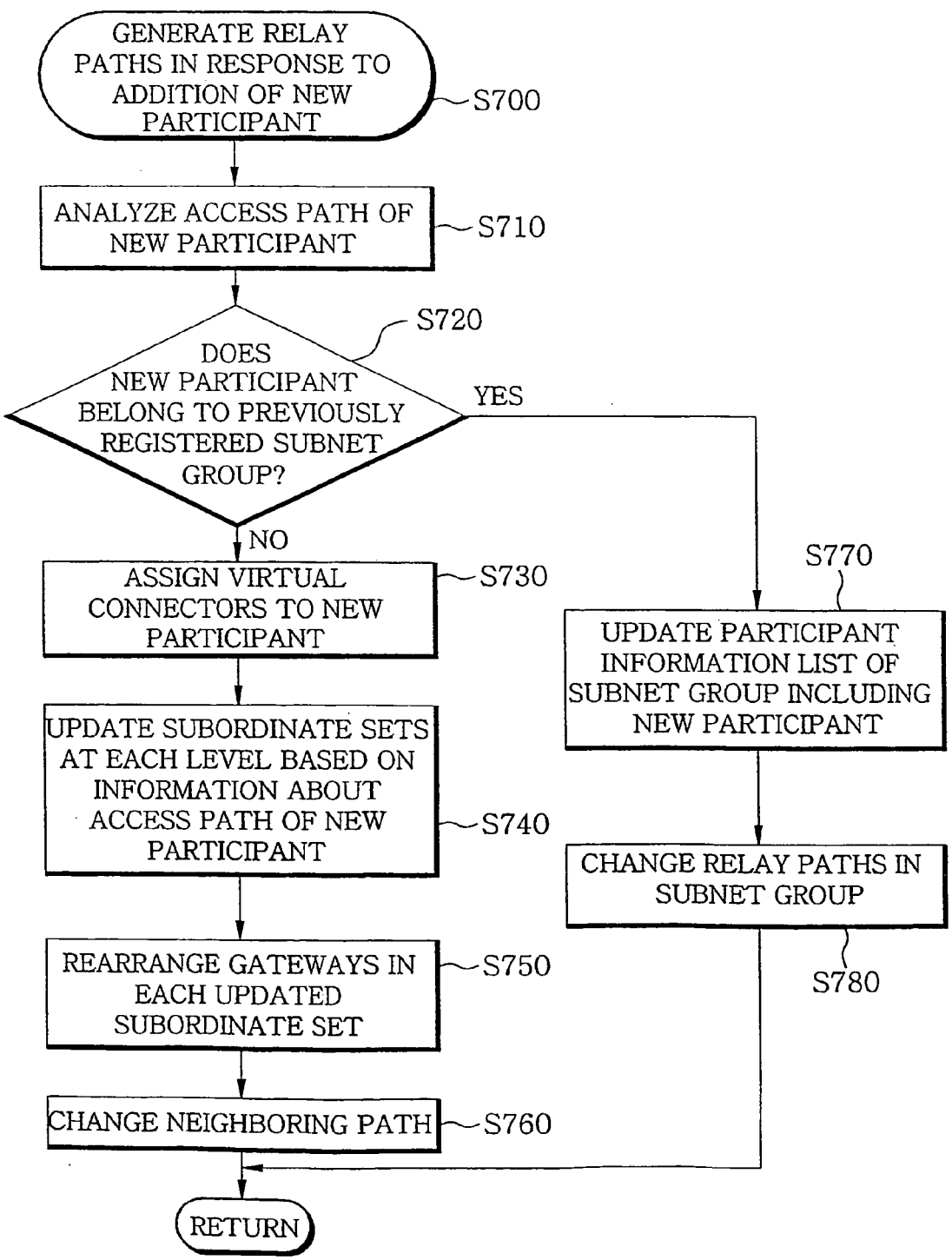
FIG. 1C is a flowchart of a procedure for changing relay paths in response to addition of a participant according to the embodiment of the present invention.

FIG. 1C is a flowchart of a procedure for changing relay paths in response to addition of a participant according to the embodiment of the present invention. After the relay paths are generated as described above, if there is a new participant, the data server searches an existing participant nearest to the new participant based on the access path of the new participant and the access paths of the existing participants and performs control so that a relay path between the searched existing participant and the new participant can be generated based on pass gateway information of the new participant.

Referring to FIG. 1C, if there is a new additional participant after the relay paths are generated, the data server analyzes the access path of the new participant in step S710. It is determined whether the new participant belongs to a subnet group previously registered in step S720.

If it is determined that the new participant belongs to a previously registered subnet group, the data server updates the participant information list of the subnet group including the new participant in step S770. In other words, the data server adds information about the new participant to the end of the participant information list. Thereafter, the data server determines the rank of the position of the new participant information in the participant information list except representative participants, takes an integer "k" obtained by dividing the rank of the position of the new participant information by 2, and generates a relay path between a participant at a position corresponding to the integer "k" and the new participant in step S780.

Referring to FIG. 2, the new participant is added to an eighth position which is the end of the participant information list, and the new participant is ranked at a sixth position among the participants other than the representative participants on the participant information list. Accordingly, the integer "k" is 3, and the data server generates a relay path for the new participant based on the integer k=3. In other words, the data server generates a relay path between the new participant and a third participant (a participant #5) among the participants except the representative participants on the participant information list.

In contrast, if it is determined that the new participant does not belong to a previously registered subnet group in step S720, the data server perform a series of steps of registering a subnet group including the new participant and gateways, through which the new participant passes, in a multi-transmission path.

Specifically, the data server assigns internal and external connectors to the new participant in step S730. Then, the data server updates subordinate sets at each level based on gateway information contained in information about the access path of the new participant in step 740. In other words, the data server classifies the gateways on the access path of the new participant into levels based on the order of precedence on the path connecting the gateways to the data server. If it is necessary to add a gateway of the new participant to a subordinate set at a certain level, the data server adds the gateway of the new participant to the subordinate set. Then, the data server rearranges gateways included in the subordinate set, to which the gateway of the new participant is added, in ascending order of the numbers of hops of the gateways in step S750. The data server changes relay paths among the rearranged subordinate set, neighboring gateways, and neighboring subordinate sets based on gateway information of the rearranged subordinate set in step S760.

Figure 1D:
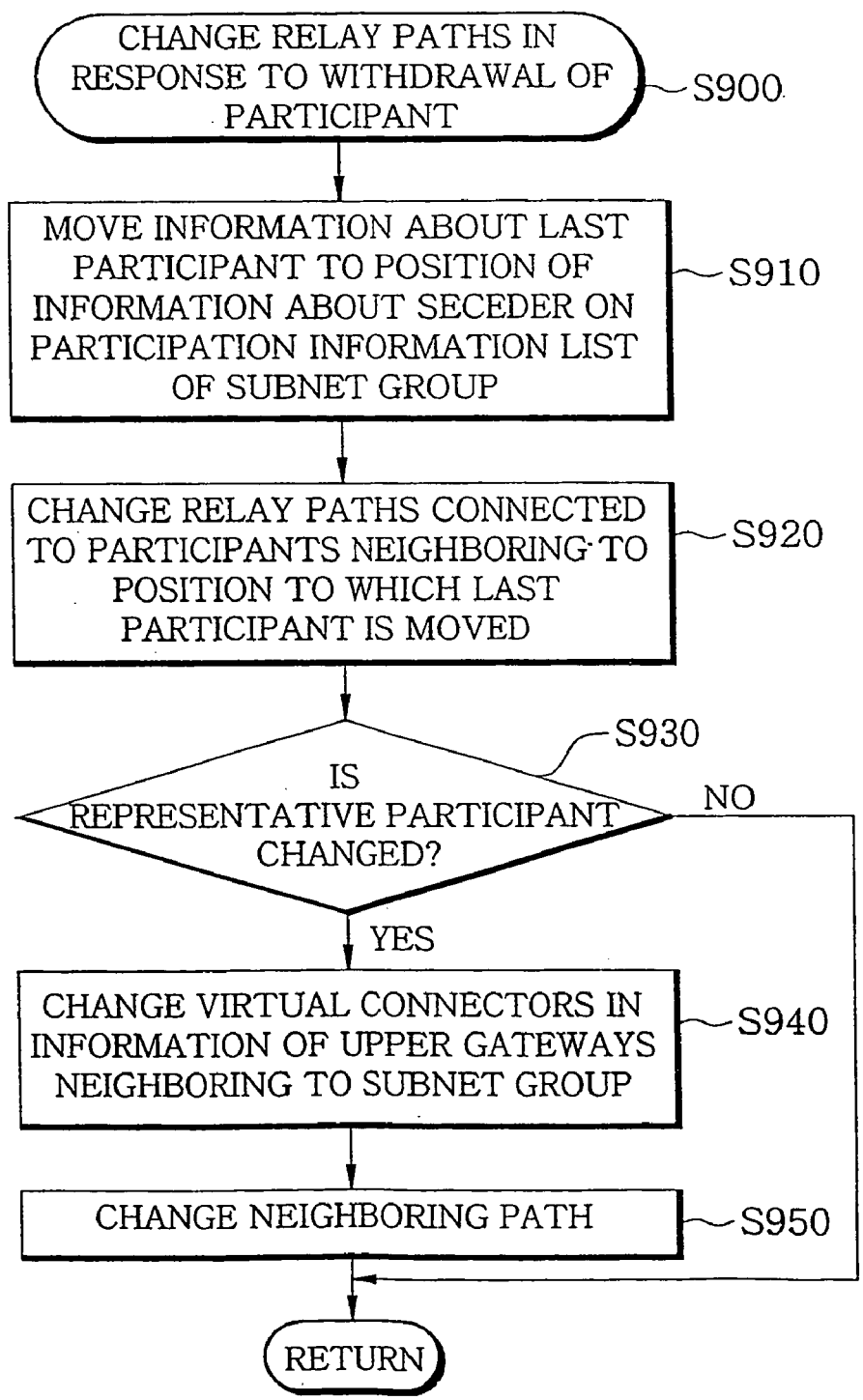
FIG. 1D is a flowchart of a procedure for changing relay paths in response to withdrawal of a participant according to the embodiment of the present invention.

FIG. 1D is a flowchart of a procedure for changing relay paths in response to withdrawal of a participant according to the embodiment of the present invention. Referring to FIG. 1D, in the case where there is a seceder after the relay paths are generated, the data server removes information about the seceder from the participant information list of a subnet group including the seceder.

In other words, the data server removes information about the seceder from the participant information list of the subnet group and moves participant information at the end of the participant information list to a position of information about the seceder in step 910. Then, the data server changes a relay path connected to participants neighboring the position to which the last participation is moved in step S920. Referring to FIG. 2, if the participant #4 withdraws, the data server removes the participant #4 from the participant information list and moves the participant #7 at the end of the participant information list to the position of the participant #4. Accordingly, only the relay paths connected to participants #3, #6, and #7 neighboring to the participant #4 are changed, and the relay paths connected to the other participants of the subnet group or the relay path connected to participants of other subnet groups are maintained. In other words, if an arbitrary participant withdraws, only relay paths connected to a seceder are changed, and the other relay paths are maintained.

However, if it is determined that a seceder is a representative participant of the subnet group in step S930, that is, if a representative participant of the subnet group changes, the data server changes virtual connectors of an upper gateway neighboring to the subnet group based on changed representative participant information and then changes a relay path connected to the subnet group in steps S940 and S950. This is because the data server generates a relay path between the subnet group and its upper neighboring gateway according to an external connector assigned to a representative participant of the subnet group.

Figure 3:
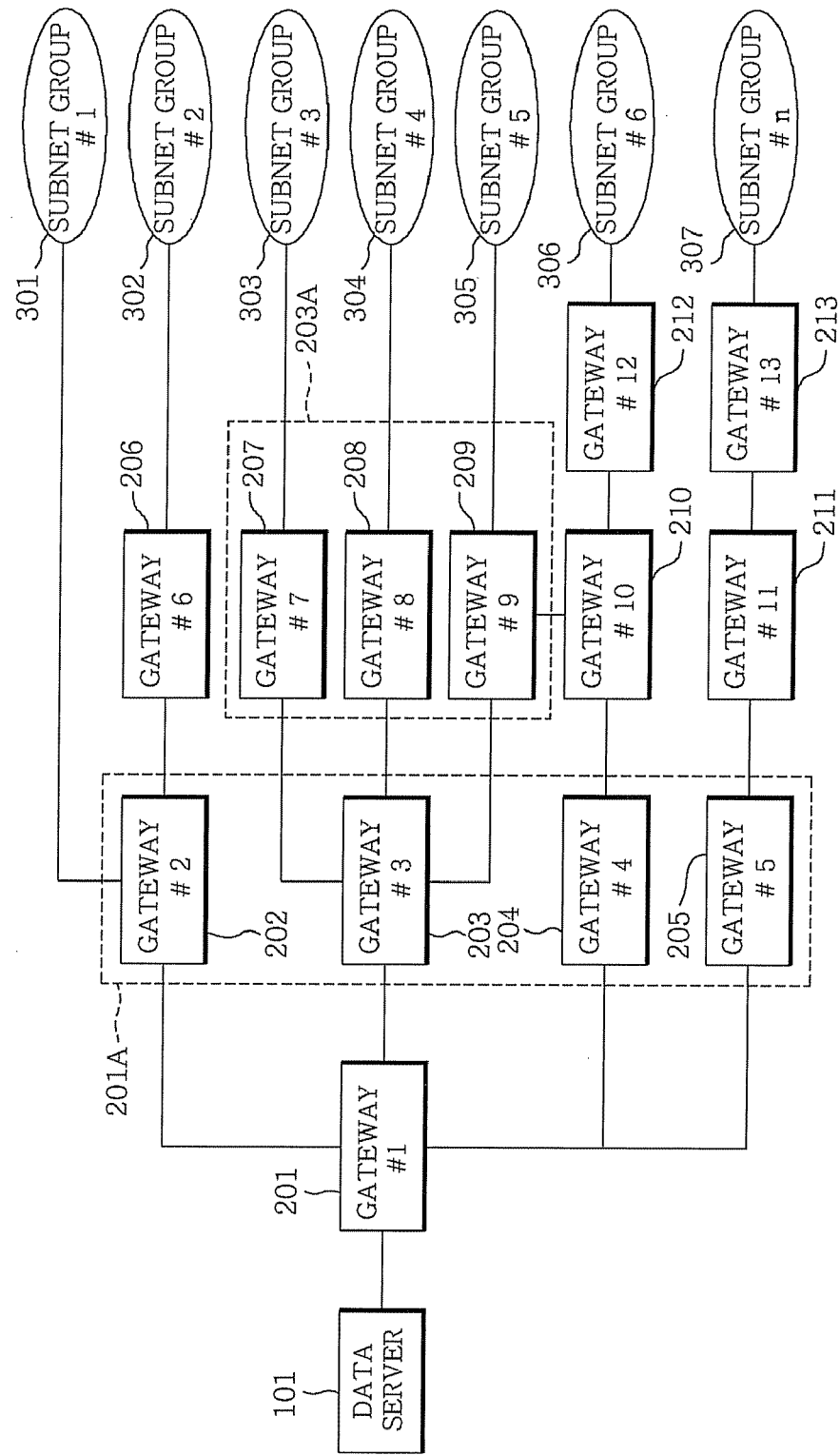
FIG. 3 illustrates the arrangement of gateways on access paths of participants in multi-transmission according to the embodiment of the present invention.

FIG. 3 illustrates the arrangement of gateways on access paths of participants in multi-transmission according to the embodiment of the present invention.

FIG. 3 shows the result that a data server 101 arranges gateways which participants pass through in order of precedence on a connection path to the data server 101. Referring to FIG. 3, gateways #2 through #5 202 through 205 are classed as a subordinate set 201A of a gateway #1 201. Gateways #7 through #9 207 through 209 are classed as a subordinate set 203A of the gateway #3 203.

Here, gateway arrangement has been performed on the subordinate sets 201A and 203A by the data server 101. This is for increasing efficiency of data transmission by minimizing the access path of each participant in a binary tree structure of relay paths.

In the meantime, the data server 101 calculates the number of hops of each gateway included in an arbitrary subordinate set using the average of the numbers of hops from the gateway to subnet groups. Here, the data server 101 does not calculate the average of the numbers of hops of all gateways included in the subordinate set but calculates the average of two least numbers of hops.

For example, in the case of the gateway #2 202, the number of hops between the gateway #2 202 and a subnet group #1 301 is 1, and the number of hops between the gateway #2 202 and subnet group #2 302 is 2. The average of the numbers 1 and 2 of hops is 1.5, which is determined as the number of hops of the gateway #2 202.

As a result of calculating the numbers of hops of each gateway through the above procedure, the number of hops of the gateway #2 202 is 1.5, the number of hops of the gateway #3 203 is 2, and the number of hops of the gateway #4 204 is 3.

Figure 4:
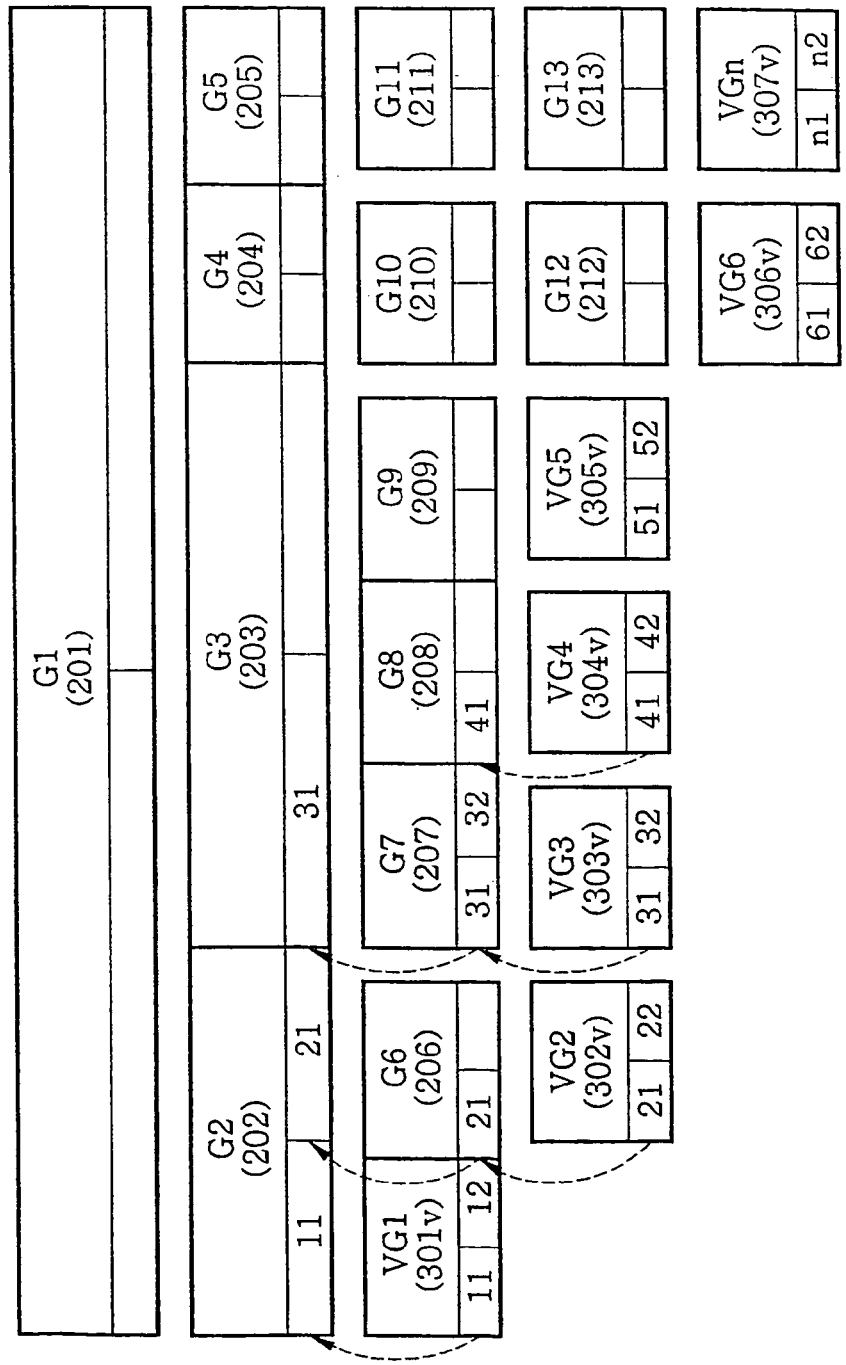
FIG. 4 illustrates a procedure for transmitting a virtual connector necessary for forming a relay path according to the embodiment of the present invention.

FIG. 4 illustrates a procedure for transmitting a virtual connector necessary for forming a relay path according to the embodiment of the present invention. FIG. 4 is a diagram for explaining a procedure for transmitting virtual connectors in order to generate relay paths among the gateways and subnet groups which are arranged as shown in FIG. 3.

First, the data server 101 selects representative participants from participants of each of the subnet groups 301 through 307, generates a virtual gateway having the representative participants as virtual connectors, and virtually adds the virtual gateway to an arranged path.

A virtual path to which virtual gateways are added is illustrated in FIG. 4. In FIG. 4, a gateway #1 is represented by G1, a gateway #13 is represented by G13, the virtual gateway of a subnet group #1 is represented by VG1, and the virtual gateway of a subnet group #n is represented by VGn. Spaces for indicating virtual connectors are provided below each gateway. Each gateway has the external connectors of representative participants as virtual connectors. In FIG. 4, the virtual connectors of the virtual gateway VG1 are represented by 11 and 12, respectively, and the virtual connectors of the virtual gateway VGn are represented by n1 and n2, respectively.

Referring to FIG. 4, since the G1 201 is the only gateway in a subordinate set, the G1 201 does not need virtual connectors for generating relay paths to other gateways in the subordinate set.

The lower subordinate set of the G1 201 includes four gateways G2 202, G3 203, G4 204, and G5 205. When the data server generates relay paths among them, the G2 202 coming first needs two virtual connectors to generate a relay path between the G2 202 and the G3 203 and a relay path between the G2 202 and the G4 204. The G3 203 needs one virtual connector to generate a relay path between the G3 203 and the G5 205.

Accordingly, the data server receives two virtual connectors from VG1 301v and G6 206, respectively, which constitute a lower subordinate set of the G2 202 and assigns them to the G2 202. In other words, the data server receives a virtual connector "11" assigned to the VG1 301v and a virtual connector "21" assigned to a VG2 302v connected to the G6 206 and assigns them to the G2 202.

With such operations, the virtual connector "12" of the VG1 301v relays data to the virtual connector "21" of the VG2. In other words, a relay path between the virtual connector "12" of the VG1 301v and the virtual connector 21 of the VG2 302v is generated.

In addition, since the G3 203 needs one virtual connector for generation of a relay path to the G5 205, the data server receives one virtual connector from a G7 207, which is at the first place among gateways constituting the lower subordinate set of the G3 203, and assigns it to the G3 203. The subordinate set of the G3 203 is composed of three gateways G7 207, G8 208, and G9 209, so relay paths among the gateways G7 207, G8 208, and G9 209 needs to be generated. Since the G7 207 should transmit one virtual connector to the G3 203 at its upper level, the G7 207 needs one virtual connector to be transmitted to the upper level, i.e., G3 203 and one virtual connector used for generating a relay path within the subordinate set to which it belongs. In other words, the G7 207 needs two virtual connectors. Therefore, the data server requests two virtual connectors from a VG3 303v connected to the G7 207 at a lower level. Then, the data server receives virtual connectors "31" and "32" from the VG3 303v, assigns the virtual connector "31" to the G3 203, and generates a relay path to a gateway G8 208 within the subordinate set using the virtual connector "32".

Here, the data server receives a virtual connector "41" for generating a relay path between the G8 208 and a G9 209 from a VG4 304v connected to the G8 208 at a lower level and generates the relay path between the G8 208 and the G9 209. In other words, the data server generates a relay path between the virtual connector "41" and a virtual connector "51" of a VG5 305v connected to the G9 209 at a lower level.

Meanwhile, the virtual connector "21" of the G2 202 relays data to the G4 204, and the G4 204 transmits the data to a virtual connector "61" of a VG6 306v connected thereto at a lower level. In other words, the data server generates a relay path between the virtual connectors "21" and "61".

In addition, the G5 205 receives data from the virtual connector "31" of the G3 203 and transmits the data to a virtual connector "n1" of a VGn 307v connected thereto at a lower level. In other words, the data server generates a relay path between the virtual connectors "31" and "n1".

Figure 5:
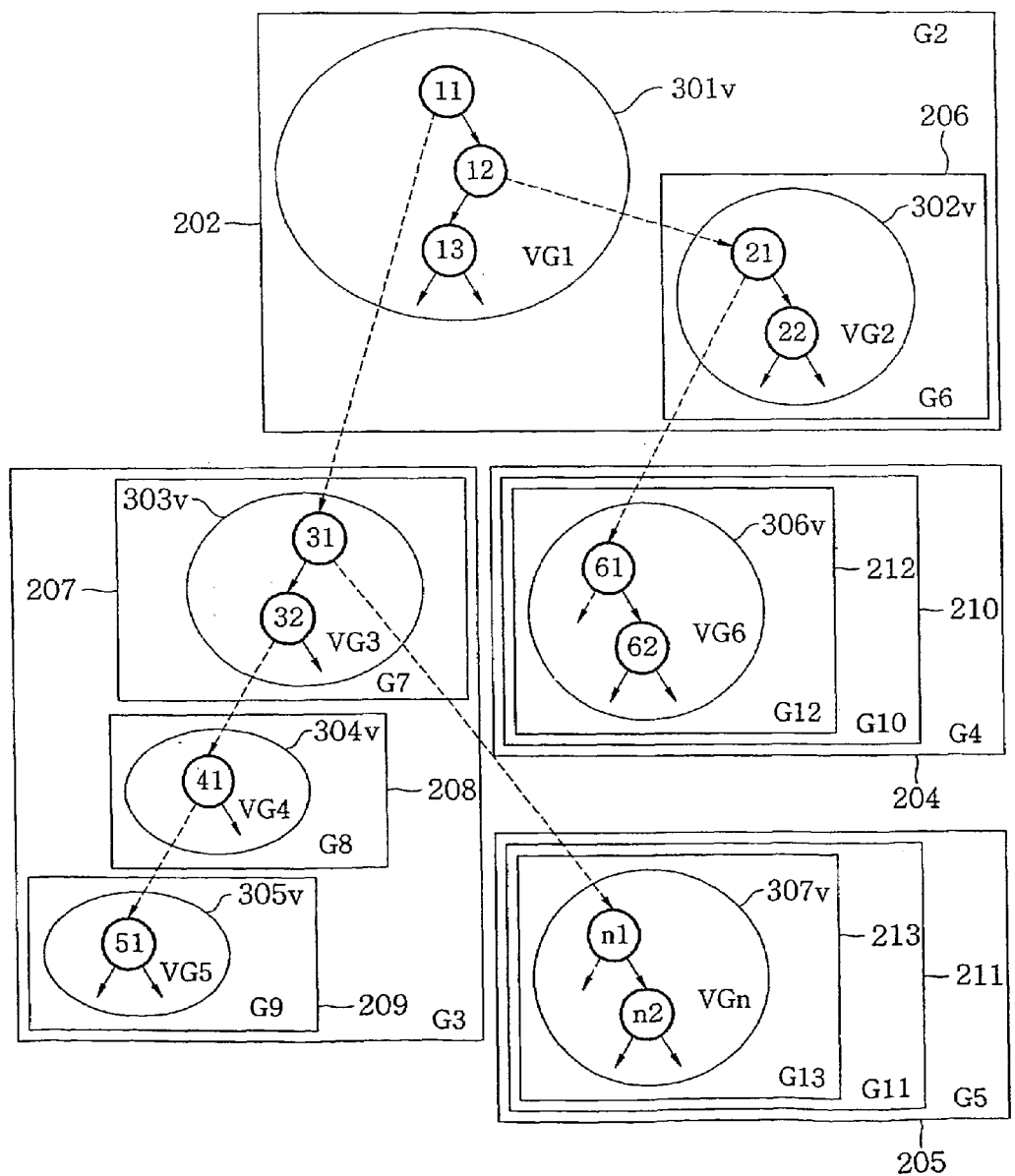
FIG. 5 is a diagram of the result of generating relay paths among the gateways and subnet groups shown in FIG. 3 according to the embodiment of the present invention.

FIG. 5 is a diagram of the result of generating relay paths among the gateways and subnet groups shown in FIG. 3 according to the embodiment of the present invention. FIG. 5 shows relay paths generated among representative participants of respective subnet groups as a result of performing the above steps. In FIG. 5, a dotted line indicates an external connector, and a solid line indicates an internal connector.

Figure 6C:
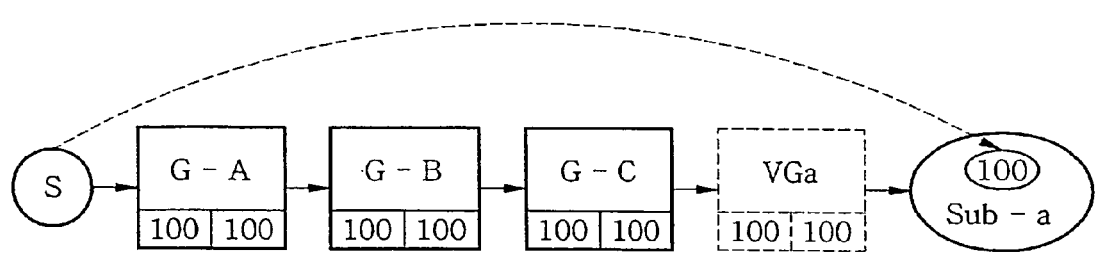
FIGS. 6A through 9C illustrate procedures for changing relay paths in response to addition and withdrawal of a participant in multi-transmission and the results of the procedures according to the embodiment of the present invention.
Figure 7C:
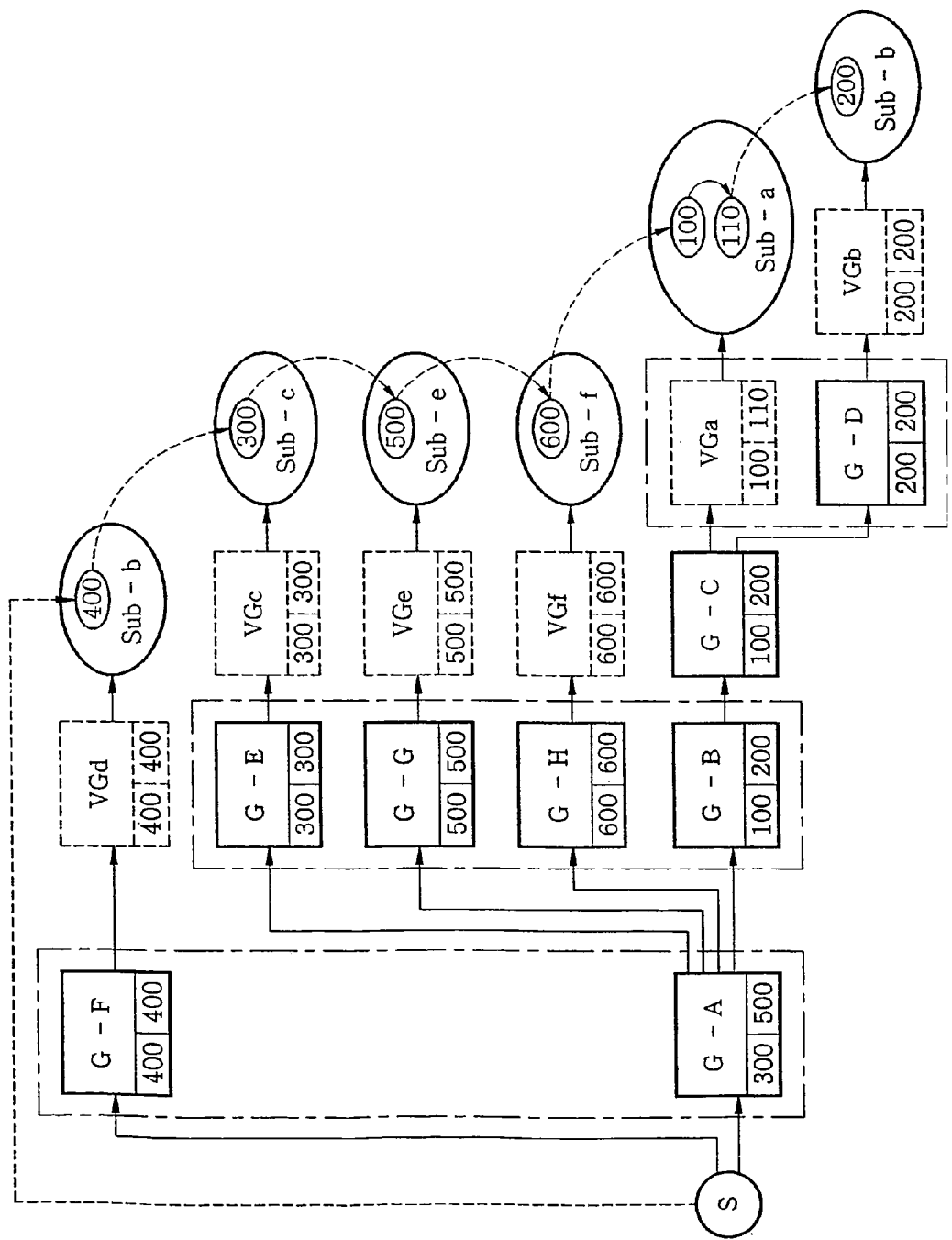
Figure 8:
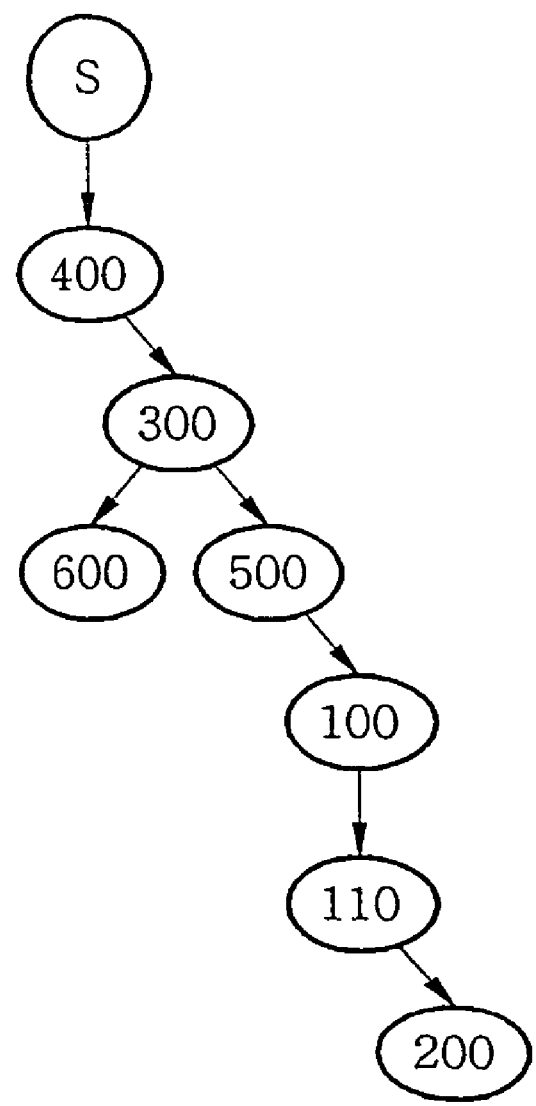
Figure 9B:
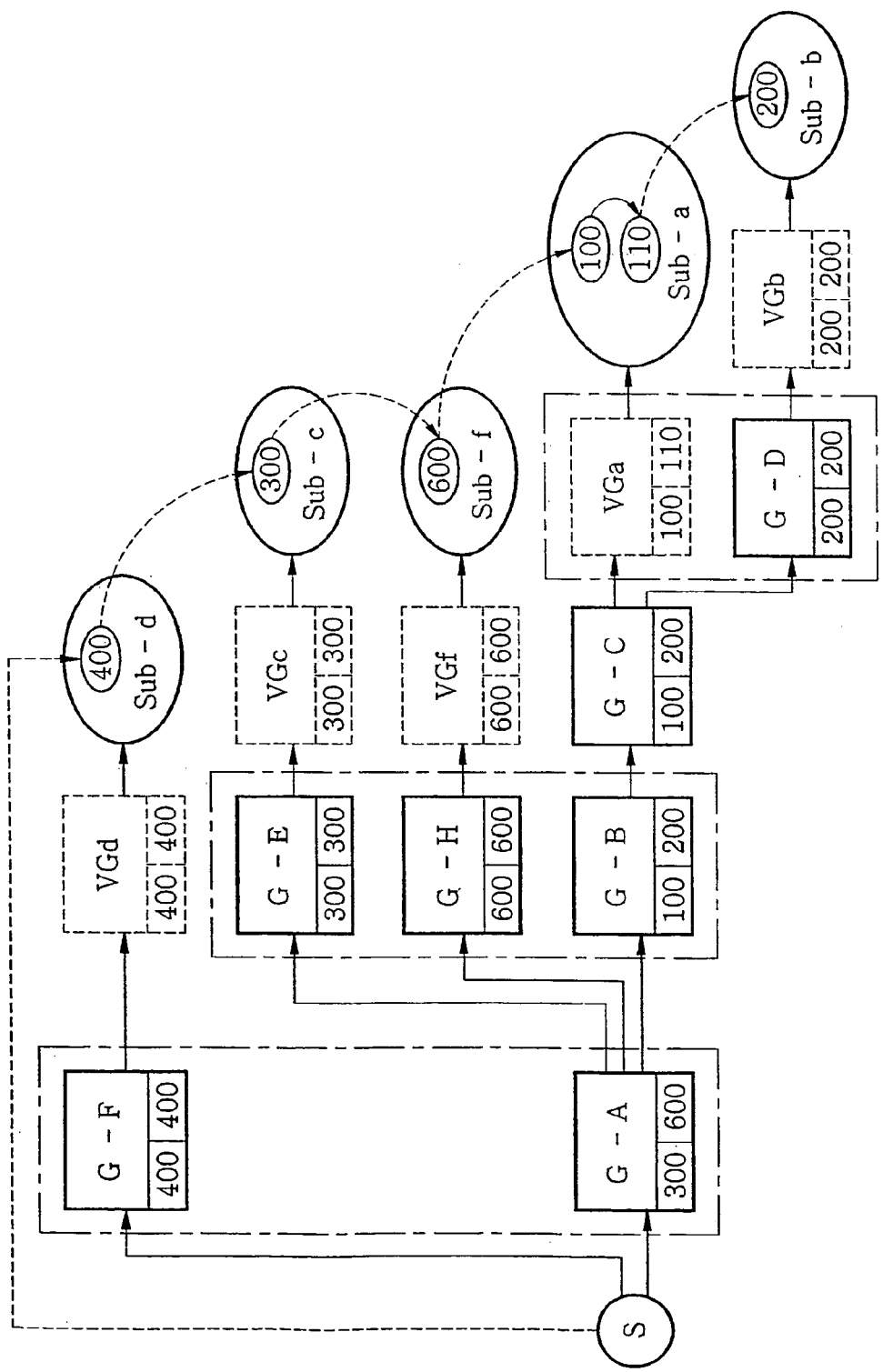
Figure 9C:
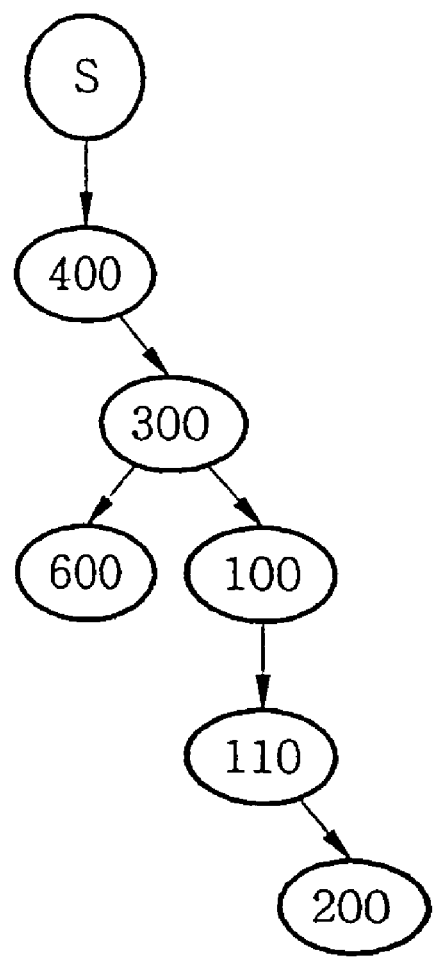

FIGS. 6A through 9C illustrate examples of procedures for changing relay paths in response to addition and withdrawal of a participant in multi-transmission and examples of the results of the procedures according to the embodiment of the present invention. FIGS. 6A through 6C show a procedure of adding a first new participant according to the present invention. FIGS. 7A through 7C show a procedure of adding a plurality of participants. FIG. 8 shows relay paths finally generated as the result of performing the procedures shown in FIGS. 6A through 7C. FIGS. 9A through 9C show a procedure of removing a participant who withdraws.

As shown in FIG. 6A, when a participant 100 who passes through a gateway G-A, a gateway G-B, and a gateway G-C and belongs to a subnet group Sub-a participates in multi-transmission for the first time, a data server generates databases' for managing gateways by levels and virtual connector information of each gateway based on information about the participant, as shown in FIG. 6B. In FIG. 6B, (a) through (c) denote databases for managing the gateways at different levels, (d) denotes a database for managing a virtual gateway for the subnet group, and (e) denotes a database for managing a participant information list for the subnet group.

Referring to FIG. 6B, there is only one participant 100 in multi-transmission at present. The virtual connectors of all of the gateways are "100", and data is directly transmitted from the data server to the participant 100 through a path as shown in FIG. 6C.

In the case where 6 participants are sequentially added, as shown in FIG. 7A, the data server generates databases for managing gateways on the access paths of the participants, as shown in FIG. 7B.

In FIG. 7B, (a) through (c) denote databases for managing gateways by levels, (d) through (i) denote databases for managing virtual gateways for subnet groups to which the participants belong, and (j) through (o) denote databases for managing participant information lists by subnet groups.

Here, each of the databases for managing gateways by levels manages the result of arranging gateways according to the number of hops of each gateway. According to the result of arrangement, one of the virtual connectors of first and second gateways at a certain level is transmitted to a first gateway at an upper level as a virtual connector.

FIG. 7C shows the entire connection path among gateways on the access paths of participants, virtual gateways, and subnet groups. Referring to FIG. 7C, the data transmission paths of the participants are determined according to the arranged order of the gateways regardless of the order of participation of the participants. This is because when a new participant is added, the data server searches a participant neighboring to the new participant based on the access path of the new participant and generates a relay path between the new participant and the neighboring participant.

FIG. 8 shows relay paths finally generated as the result of performing the procedures shown in FIGS. 6A through 7C. Referring to FIG. 8, a participant 400 passing through a gateway having the least number of hops receives data from the data server and relays the data to a neighboring participant, and relay paths among the other participants are generated according to the order of adjacency.

FIGS. 9A through 9C show an example of a case where a participant 500 withdraws from the multi-transmission in FIGS. 7A through 7C. FIG. 9A shows the state of databases rearranged after the only gateway through which the participant 500 passes is removed in response to the withdrawal of the participant 500. FIG. 9B shows a changed connection path after the withdrawal of the participant 500. FIG. 9C shows the changed structure of relay paths after the withdrawal of the participant 500.

While this invention has been particularly shown and described with reference to a preferred embodiment thereof, it will be understood by those skilled in the art that the present invention is not restricted to the above embodiment, and various changes may be made within the scope which does not beyond the essential characteristics of this invention. For example, the shape and structure of each element specified in the above embodiment can be changed.

INDUSTRIAL APPLICABILITY

The present invention is characterized by generating a binary tree structure of relay paths based on the result of analyzing the initial access of each participant in multi-transmission. Accordingly, it is easy for a data server to add a connection path even when an unspecified number of users simultaneously access, and a change in relay paths due to addition or withdrawal of a participant can be minimized. Moreover, even when a participant at an upper level withdraws from the multi-transmission, the access state of lower receivers and the reliability of data transmission can be secured.

Therefore, according to the present invention, the data server can easily perform data relay among participants in multi-transmission regardless of the number of participants and systematically manage the participants.

What is claimed is:

1. A method for generating relay paths among a plurality of participants in multi-transmission to provide predetermined data to the participants, the method comprising:

a first step of analyzing access paths of the participants;

a second step of generating a binary tree structure of relay paths among participants belonging to each subnet group;

a third step of arranging gateways on the access paths of the participants according to the order on a connection path connecting the gateways to a data server;

a fourth step of classing gateways, which are connected to the same upper gateway and are at the same level as a result of the arrangement, as a subordinate set of the upper gateway; and a fifth step of calculating the number of hops of each gateway within the subordinate set to a corresponding subnet group and generating a binary tree structure of relay paths starting from a gateway having relatively fewer hops toward a gateway having relatively more hops; and wherein the second step comprises the steps of:

(2-1) generating a participant information list for each subnet group by arranging participants belonging to the corresponding subnet group according to the order of participation in the multi-transmission;

(2-2) selecting as representative participants a plurality of participants, who have participated in the multi-transmission earlier than the other participants, based on the participant information list;

(2-3) assigning an internal connector and an external connector to each of the representative participants, the internal connector being used for generating a relay path between a representative participant and another participant in a subnet group to which the representative participant belongs, the external connector being used for generating a relay path between a representative participant and a participant belonging to another subnet group to which the representative participant does not belong;

(2-4) generating a binary tree structure of relay paths among the remaining participants other than the representative participants within each subnet group; and (2-5) generating a relay path between the representative participants and a participant at the top of the binary tree structure of relay paths in each subnet group, using the internal connectors of the representative participants.

2. The method of claim 1, wherein the step (2-4) comprises generating relay paths from an n-th participant to a 2n-th participant and to a (2n+1)-th participant among the remaining participants other than the representative participants on the participant information list.

3. The method of claim 2, wherein in the fifth step, when a gateway G in a subordinate set A is an upper gateway of another subordinate set "a" including a plurality of gateways gs, the number of hops of the gateway G is calculated by averaging the two least numbers of hops among the numbers of hops of the gateways gs in the subordinate set "a".

4. The method of claim 3, wherein the fifth step comprises the steps of:

(5-1) arranging gateways in each subordinate set in ascending order of the number of hops of each gateway;

(5-2) assigning the number of virtual connectors necessary for generating relay paths to each gateway in each subordinate set based on the number of gateways included in the corresponding subordinate set;

(5-3) requesting the assigned number of virtual connectors for each upper gateway from a gateway or a subordinate set which is connected to the upper gateway requesting virtual connectors and is at a lower level than the upper gateway; and (5-4) generating a binary tree structure of relay paths among upper gateways which belong to the same subordinate set and request virtual connectors from their lower level gateways or subordinate sets, using the virtual connectors transmitted from the lower gateways or subordinate sets in response to the request.

5. The method of claim 4, wherein the step (5-2) comprises assigning a maximum of two virtual connectors to each gateway.

6. The method of claim 4, wherein in the step (5-2), when an upper gateway requests virtual connectors from its subordinate set, two gateways having the least numbers of hops among gateways included in the subordinate set assign their virtual connectors for responding to the request of the upper gateway first to the upper gateway.

7. The method of claim 6, wherein the step (5-4) comprises generating relay paths from an n-th gateway to a 2n-th gateway and to a (2n+1)-th gateway among gateways other than the gateways, which are assigned the virtual connectors for responding to the request of the upper gateway, in the subordinated set of the upper gateway.

8. The method of claim 4, wherein in the step (5-3), when a gateway is connected to a subnet group at a lower level, the gateway requests an external connector of a representative participant of the subnet group.

9. The method of claim 1, when there is a new participant in the multi-transmission, further comprising a sixth step of searching an existing participant nearest to the new participant based on an access path of the new participant and the access paths of the existing participants and generating a relay path between the new participant and the searched existing participant.

10. The method of claim 9, wherein the sixth step comprises adding information about the new participant to the end of the participant information list for a subnet group to which the new participant belongs, determining the rank of the position of the new participant on the participant information list among the participants other than the representative participants, and generating the relay path between the new participant and another participant at a position corresponding to an integer "k" obtained by dividing the determined rank by 2.

11. The method of claim 9, wherein when a subnet group to which the new participant belongs has no participants other than the new participant, the sixth step comprises the steps of:

(6-1) assigning an internal connector and an external connector to the new participant, the internal connector being used for generating a relay path between the new participant and another participant in the subnet group to which the new participant belongs, the external connector being used for generating a relay path between the new participant and another participant belonging to another subnet group to which the new participant does not belong;

(6-2) dividing gateways on the access path of the new participant into levels based on the order of precedence on the path connecting the gateways to the data server, and adding the gateways on the access path of the new participant to corresponding subordinate sets at each level when necessary;

(6-3) calculating the numbers of hops of individual gateways to relevant subnet groups, the individual gateways belonging to each subordinate set to which one of the gateways on the access path of the new participant is added, and rearranging the gateways including the gateway connected to the new participant in the corresponding subordinate set in ascending order of the number of hops; and (6-4) changing relay paths among the rearranged subordinate set, neighboring gateways, and neighboring subordinate sets.

12. The method of claim 9, when there is a participant withdrawing from the multi-transmission, further comprising moving participant information at the end of the participant information list for a subnet group to which the withdrawing participant belongs to the position of information about the withdrawing participant on the participant information list and changing relay paths among a participant moved from the end to the position of the withdrawing participant and participants neighboring to the position of the withdrawing participant.

* * * * *